March 18, 1941.  E. DURANT  2,235,255
CONNECTING DEVICE
Filed July 13, 1939
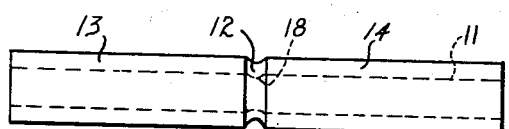
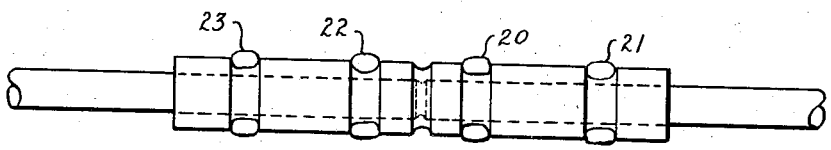
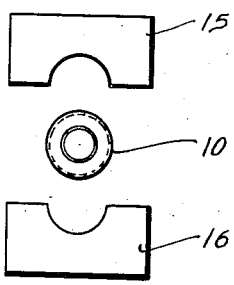
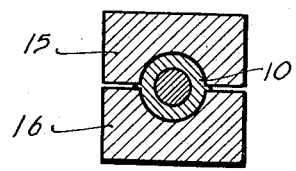
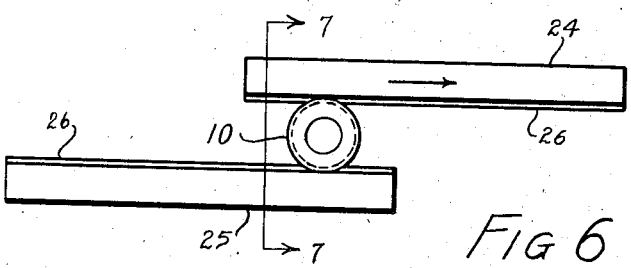
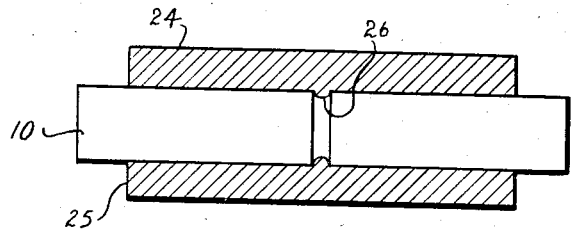
INVENTOR.
Edward Durant
BY
ATTORNEY.

Patented Mar. 18, 1941

2,235,255

UNITED STATES PATENT OFFICE 2,235,255

CONNECTING DEVICE

Edward Durant, Cleveland, Ohio, assignor to The National Telephone Supply Company Application July 13, 1939, Serial No. 284,291

1 Claim. (Cl. 16—108)

My invention relates in general to connecting devices and more particularly to tubular sleeves for electrically and mechanically joining the ends of wires used for telephone, telegraph and other purposes.

In using a tubular sleeve to connect wires, the ends of the wires are inserted into the opposite ends of the sleeve and then the sleeve is compressed circumferentially to secure the wires therein. An example of a tubular sleeve is shown and described in Patent No. 1,936,185, issued to O. W. Brenizer on November 21, 1933. In circumferentially compressing the sleeve, because it expands longitudinally, the operator begins substantially in the center where the ends of the wires meet and works outwardly towards the ends. To facilitate the centering of the wire intermediate the ends of the sleeve, the practice heretofore has been to nick or punch the sleeve radially with a center punch on one side substantially mid-way between its ends to produce an internal boss or restriction against which the ends of the wires may abut when pushed into the sleeve. While the nicking or punching served to facilitate the centering of the wires, it produced several disadvantages. In the first place, it was not always easy for the operators to know where the center was. That is, if the external mark produced by the nick or punch were on the bottom or reverse side, it was necessary to rotate the sleeve until the mark was visible. In the second place, the nick or punch weakened the center portion of the sleeve, as well as caused buckling of the sleeve.

Therefore, an object of my invention is to provide for facilitating the centering of the ends of the wires within a sleeve without weakening the central portion of the sleeve.

Another object of my invention is to provide an external mark which extends circumferentially around the sleeve to obviate necessity of rotating the sleeve.

Another object of my invention is to provide an external mark which strengthens the central portion of the sleeve.

Another object of my invention is to provide an internal boss or restriction which extends circumferentially around the internal diameter of the sleeve.

Another object of my invention is the method of rolling a groove entirely around the sleeve.

Another object of my invention is to facilitate the rapid manufacturing of the sleeves.

Other objects and a fuller understanding of my invention may be had by referring to the following description and claim, taken in conjunction with the accompanying drawing, in which:

Figure 1 is a side view of my improved wire connecting device;

Figure 2 is an end view of Figure 1;

Figure 3 is a side view of my improved wire connecting device, securing the ends of two wires together;

Figure 4 is an end view of two open dies in readiness to circumferentially compress the sleeve about the wires;

Figure 5 is a cross sectional end view showing the dies in a closed position, compressing the sleeve about the wires;

Figure 6 is a side view illustrating the method of rolling a groove entirely around the sleeve; and Figure 7 is a cross sectional end view taken along line 7—7 of Figure 6.

With reference to the drawing, my improved connecting device comprises a tubular body or sleeve 10 having a longitudinal opening 11 extending therethrough to receive from opposite ends of the tubular body the ends of the wires to be joined. The tubular body 10 may be made of copper, bronze, steel, or any other suitable material and comprises an intermediate portion 12 and two end portions 13 and 14 adapted to be circumferentially compressed, for example, at spaced longitudinal locations 20, 21, 22 and 23 (see Figure 3) by suitable dies 15 and 16, as shown in Figures 4 and 5. The intermediate portion 12 integrally joins the two end portions 13 and 14 and extends circumferentially around the tubular body. The intermediate portion 12 has respectively smaller internal and external diameters 18 and 17 than the two end portions 13 and 14. The smaller internal diameter 18 constitutes an internal boss or restriction, or stop for the ends of the wires to be joined. The internal boss 18 extends entirely around the inside of the tubular body and since it will be engaged circumferentially by the ends of the wires pushed into the sleeve it need not extend radially in so far as a single boss or restriction, produced by a nick or a punch.

The external diameter 17 serves as a visible indication or mark, registering with the boss or stop 18, and obviates the necessity of rotating the sleeve when positioning the dies 15 and 16 at the locations 20 and 22, adjacent the intermediate portion 12.

In the manufacture of my connecting device, the intermediate portion 12 may be provided by rolling the tubular body 10 between two members 24 and 25 each having a raised central portion 26, see Figures 6 and 7. Tests show that the intermediate portion 12, as produced by the rolling action is stronger than the end portions 13 and 14. That is to say, the intermediate portion 12 is the strongest part instead of the weakest part as is the case with the nicked or punched sleeve. The rolling action, since it makes a complete circumferential roll, prevents the sleeve from buckling as is caused by nicking or punching the sleeve on one side. The rolling method also lends itself to rapid manufacturing.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

A connecting device for joining the ends of wires subjected to great tensile load stresses comprising a tubular body having a longitudinal bore therethrough to receive from opposite ends of the tubular body the ends of the wires to be joined, said tubular body having an intermediate portion and two end portions, the end portions comprising malleable material for engaging the ends of the said wires, the diameter of the longitudinal bore within the two end portions being substantially the same throughout the entire length thereof and being slightly larger in diameter than the ends of the inserted wires, said malleable material of the end portions being compressible about the inserted ends of the wires at spaced longitudinal intervals for securely holding the ends of the wires therein against great tensile load stresses, the intermediate portion comprising a relatively narrow annular band of rolled-worked material integrally joining the two end portions and extending circumferentially around the tubular body, said rolled-worked intermediate portion being capable of withstanding a greater tensile load stress than the two end portions and having smaller external and internal diameters than the two end portions, the smaller internal diameter constituting a stop for the inserted ends of the said wires and the smaller external diameter serving as a visible indication registering with the stop for the inserted end of said wires.

EDWARD DURANT.